United States Patent [19]

Ott et al.

[11] 4,352,653
[45] Oct. 5, 1982

[54] CLAMPING DEVICE FOR MOLDS USED IN THE BLOW MOLDING OF HOLLOW PLASTIC ARTICLES

[75] Inventors: Lothar Ott, Schwalbach; Dieter Gessner, Karben, both of Fed. Rep. of Germany

[73] Assignee: tpT Machinery Corporation, Norwalk, Conn.

[21] Appl. No.: 216,859

[22] Filed: Dec. 16, 1980

[30] Foreign Application Priority Data

Dec. 17, 1979 [DE] Fed. Rep. of Germany ....... 2950723

[51] Int. Cl.³ .......................... B29C 17/07; B29C 1/16
[52] U.S. Cl. ................................ 425/541; 425/450.1; 425/451.7; 425/451.9
[58] Field of Search .............. 425/541, 450.1, DIG. 5, 425/451.9, 451.7

[56] References Cited

U.S. PATENT DOCUMENTS

| | | | |
|---|---|---|---|
| 2,543,503 | 2/1951 | Lester et al. | 425/451.7 X |
| 3,195,186 | 7/1965 | Gauban et al. | 425/451.9 X |
| 3,669,603 | 6/1972 | Keller et al. | 425/DIG. 5 |
| 3,694,124 | 9/1972 | Saumsiegle et al. | 425/DIG. 5 |
| 3,753,641 | 8/1973 | Turner et al. | 425/541 X |
| 4,083,910 | 4/1978 | Tits et al. | 425/541 X |
| 4,105,379 | 8/1978 | Gazuit | 425/450.1 X |

FOREIGN PATENT DOCUMENTS

| | | | |
|---|---|---|---|
| 1543113 | 10/1968 | France | 425/451.9 |
| 382542 | 11/1964 | Switzerland | 425/DIG. 5 |

*Primary Examiner*—Jan H. Silbaugh
*Attorney, Agent, or Firm*—Bachman and LaPointe

[57] ABSTRACT

The disclosure deals with a clamping device for molds used in blow molding of hollow plastic articles having two halves of the mold for forming the sides of the hollow plastic article and a bottom part, wherein the halves of the mold can be moved away from each other. The invention is characterized in that during the opening of the mold the halves of the mold are moved away from each other in a longitudinal direction to said hollow plastic article and, at least partially simultaneously, in a perpendicular direction to said article.

13 Claims, 1 Drawing Figure

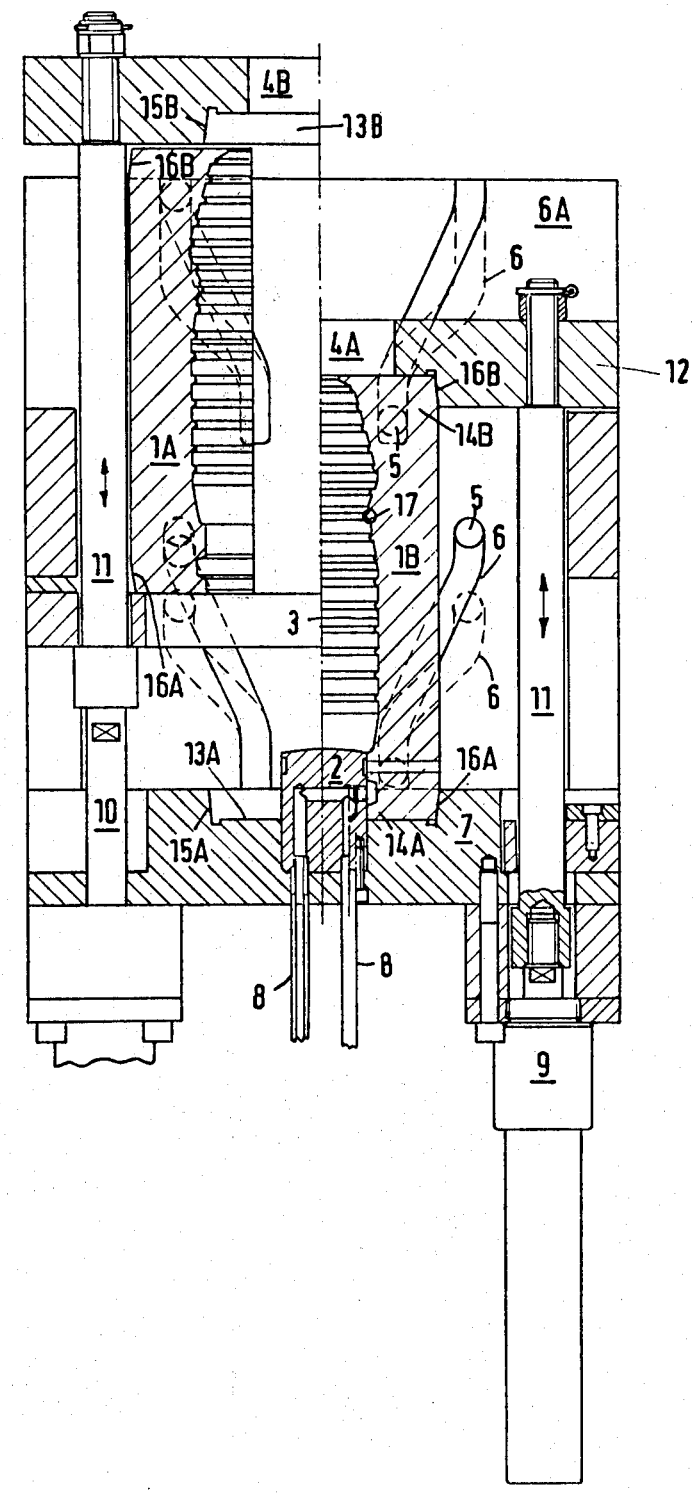

CLAMPING DEVICE FOR MOLDS USED IN THE BLOW MOLDING OF HOLLOW PLASTIC ARTICLES

BACKGROUND OF THE INVENTION

In blow molding hollow plastic articles, it is frequently necessary to produce hollow articles that require a multi-part mold so that the parts of the mold can be separated from each other in a manner that will permit the release of the finished hollow article.

Hollow articles may have many shapes. For example, they may have the form of a cylinder with a relatively flat bottom, and in this case the finished article can be released after the blow molding stage by separating the two halves of the mold in a direction perpendicular to the axis of the article. Since many articles produced by blow molding, however, have a neck or rim that is narrower than the body of the article, there may be undercuts at the neck or rim so that simple axial removal of the article is out of the question.

Very often the article is not cylindrical, but is oval or has a rim in cross-section, so that opening the mold to remove the article requires a surface area that corresponds to the particular shape of the article. Furthermore, there may be cases in which the article does not have a comparatively flat or even bottom, but in which, for example, a shape has been selected for the bottom that resembles that of a champagne bottle. Such a bottle has a bottom in which there is a part that projects into the interior space to a considerable extent. In such a case, simple opening of the mold or separating the two halves of the mold is not adequate for the removal of the article. Accordingly, a third part is needed for the mold in order to form the bottom. This part is either moved away from the article in an axial direction, while the two other parts of the mold that serve to form the sides are moved perpendicularly to the axis, or the two side parts of the mold are separated, whereupon the article remains on the part of the mold forming the bottom, and is separated from it in an axial direction.

In order to carry out the movements mentioned above, the parts of the mold must be held in a mechanism which serves to unite the parts into the mold (the mold clamp), and to lock them together so that sufficiently large forces are available to be able to counteract the pressure generated in the mold cavity during the forming process (that is, blowing under pressure) and to be able to separate the parts of the mold from each other. Such a mechanism is called a mold clamp, and such a mold clamp can be improved in accordance with the findings of the present invention.

Thus far, mold clamps have consisted of a pair of platens to which the halves of the mold were fastened. For the purpose of back-and-forth movement under the action of fluid activated cylinders, or with the aid of a toggle- or cam-mechanism, these platens may be positioned perpendicular to the mold face. The same mechanism was used not only for movement, but also for locking the parts of the mold.

If a third mold component was used for the reasons mentioned above, it was actuated by a fluid cylinder of its own, or mechanically linked to the side parts of the mold. There are many devices on the market for performing the movements mentioned above.

The blowing of hollow articles is usually carried out at a pressure of 10 bar or less, and this involves pressures at which the mechanisms described above worked satisfactorily. Thus far, too, the overall cycle of such blow molding operations was regulated in such a way that the speed at which the blow mold moved and the article was removed did not matter. Recently, however, articles have been made of plastics with a considerable resistance to deformation at the prevailing conditions used in blowing, and this resistance even tends to increase in the course of the blowing operation. Higher pressures were used, therefore, up to 40 bar, while the operating speed of the clamp parts was increased and the length of time needed for the removal of the article was reduced, because improvements in the blow molding process reduced the overall cycle significantly.

The clamping devices described above are not adequate for the tasks imposed upon them during the process so that not quite all the advantages can be obtained from the more recent blow molding methods, nor are they capable of keeping the mold in the closed position against the high blowing pressures that are required.

SUMMARY OF THE INVENTION

The purpose of the present invention is to overcome the disadvantages mentioned above and to provide a locking or clamping device capable of withstanding very high blowing pressures. At the same time, it is capable of rapid actuation and its parts are capable of moving rapidly, and all this is important in view of the speeds of the more recent blow molding processes (see U.S. Pat. No. 4,155,974). This is achieved by means of the clamping device in accordance with the present invention and the patent claims.

The present invention resides in a device for molds used in blow molding of hollow plastic articles contained in said molds including two halves of the mold for forming the sides of the hollow plastic article and a bottom part of said mold, wherein the halves of the mold are movable away from and towards each other, which comprises means associated with said mold halves and operative during the opening of the mold for moving the halves of the mold away from each other in a longitudinal direction with respect to said hollow plastic article and, at least partially simultaneously therewith, in a perpendicular direction with respect to said article.

BRIEF DESCRIPTION OF THE DRAWING

The present invention is explained below by reference to the FIGURE which shows the device of the present invention with parts in section, in which the left side of the FIGURE shows the mold in the open position, and the right side shows it in the closed position.

DETAILED DESCRIPTION

Referring to the drawing, the halves of the mold 1A and 1B and a bottom plug 2 form the mold in which a bottle corresponding to the cavity contour 3 is made.

The halves of the mold 1A and 1B are attached to mounting plates 4A and 4B, which are provided with cam followers 5 that are guided in cam tracks 6 located in a fixed plate 6A. As can be seen in the drawing, the cam tracks are each provided with parts constructed essentially parallel to the axis of the hollow plastic article in the mold and also with a part directed away from the mold in an outward direction. Thus, each cam track has upper and lower end parts wherein each end part is essentially parallel to the axis of the hollow plastic article in the mold.

Base plug 2 is mounted on stationary lower cross bar 7, and usually carries fluid cooling conduits to cool the bottom section of the bottle after the forming operation.

In a corresponding manner, the halves of the mold 1A and 1B are provided with cooling conduits (not shown), in a manner well known in blow molding practice. Lower cross bar 7 carries fluid cylinders 9, whose movable piston rods 10 are connected to tie rods 11, which in turn are attached to an upper cross bar 12 in such a manner that the said upper cross bar 12 will reciprocate in the direction of the double arrow under the action of the fluid cylinder 9; the upper cross bar 12 and mounting plate 4 are joined so that they move together.

Both cross bars 7 and 12 contain recesses 13A and 13B, which are adapted to receive the top or bottom parts 14A or 14B of the halves of the mold 1A and 1B in the closed position.

These recesses 13A and 13B exhibit tapered or slanted surfaces 15A and 15B, which match the correspondingly tapered surfaces 16A and 16B of the top parts 14A and 14B of the halves of the mold 1A and 1B. The corresponding tapers are relatively steep, and amount to 7 degrees or less; they are constructed so that they can act as locking or fastening parts.

In operation, with the mold closed as shown in the right half of the FIGURE, a parison has been introduced into the mold from the top, stretched, if this is necessary, and blown into conformance with cavity contour 3. When the article thus produced is cold enough to be removed from the mold, the fluid cylinders 9 are placed under pressure, so that an upward motion of the tie rods 11, of the upper cross bar 12, and of the mounting plates 4A and 4B takes place. The halves of the mold 1A and 1B, which are attached to their respective mounting plates 4A and 4B, are accordingly also moved upward. Under the action of the cam follower 5 in the cam tracks 6, the mounting plates 4A and 4B and the halves of the mold 1A and 1B are, at the same time, moved away from each other in a direction perpendicular to the motion of the tie rods 11. Thus, the mold halves move radially and axially.

It is evident also that the separation of the halves of the mold takes place in a direction that is exactly perpendicular to their matching surfaces. Accordingly, undercuts, as shown in the embodiment of location 17, for example, and at other locations, are released when the halves of the mold 1A and 1B separate.

In the course of the forming operation, the bottom contour of the article is formed by the stationary bottom part of the mold 2, and the article is removed from it in the manner described below.

It is noted that the tapered surfaces 16A and 16B of the halves of the mold 1A and 1B can be fully engaged by the corresponding surfaces 15A and 15B of the upper and lower cross bars 12 and 7, respectively. The forces exerted on the surface of the mold cavity 3 are counteracted by fluid cylinders of moderate size, which are relatively small in comparison with the locking cylinders that would be needed if they had to act directly against the halves of the mold 1A and 1B, as has been customary heretofore. According to the present invention, the force to be received has been reduced in proportion to the tangent of the angle of the tapers 16A and 16B, respectively.

For this reason, the operation of the clamping device according to the present invention requires less fluid, which must be supplied to the cylinders and be removed from them during each reciprocal cycle, resulting in a higher operating speed at reduced cost.

It is noted that the finished article is carried upward by the halves of the mold 1A and 1B when they are separated from each other so that the article can be removed. In this context reference is made to the previously referred to U.S. Pat. No. 4,155,974. In that patent, a transfer finger is placed into the neck or rim of the article, and the article is then removed from the mold under established, controlled conditions. In the present invention, a transfer finger can be inserted before the halves of the mold 1A and 1B are separated from each other. A platform, not shown here, can be arranged in such a way that it is moved by the upward movement of upper cross bar 12. In this way, the whole assembly, with the transfer finger holding the finished article by the inside of the neck, is moved upward. At the same time, the transfer finger prevents the article from falling out, and also carries it upward, separates it from the bottom part of the mold 2, and finally takes it out of the space between the halves of the mold 1A and 1B.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A mold assembly having segmented side mold portions, for example, to be used in blow molding of hollow plastic articles, which comprises side mold portions, each having upper and lower ends, movable away from each other to open said mold, means associated with said side mold portions and operative during the opening thereof for moving said portions first in an axial direction without separating said portions and subsequently in continuation of said movement linearly away from each other such that parting faces of said portions maintain a lateral alignment, said mold assembly including upper and lower members, each respectively cooperative with said upper and lower ends of said mold portions with means therein for receiving and locking the side mold portions in the closed position.

2. A mold assembly according to claim 1 including mounting plates connected to said side mold portions, wherein said plate or side mold portions are provided with cam followers which in turn are guided by cam tracks.

3. A mold assembly according to claim 2 including two cam followers for each side mold portion.

4. A mold assembly according to claim 2 wherein the cam tracks are each provided with parts constructed essentially parallel to the axis of the closed mold and each having a part directed away from said mold in an outward direction.

5. A mold assembly according to claim 4 wherein each cam track has upper and lower end parts and wherein each end part is essentially parallel to the axis of the closed mold.

6. A mold assembly according to claim 1 including an upper and lower bar associated with said side mold portions with means therein for receiving and locking said portions in the closed position.

7. A mold assembly according to claim 6 wherein said receiving and locking means are provided with tapered surfaces matching corresponding tapered surfaces of said portions.

8. A mold assembly according to claim 7 wherein said taper is 7 degrees or less.

9. A mold assembly according to claim 1 wherein said mold includes a bottom part and wherein said bottom part is stationary.

10. A mold assembly according to claim 1 wherein said portions are mold halves.

11. A mold assembly according to claim 1 wherein said mold has a bottom part and wherein said means associated with said portions are operative to first move the portions away from said bottom part.

12. A mold assembly according to claim 7 wherein said means for moving is operative to move said portions axially to clear said tapered surfaces.

13. A mold assembly having a bottom part and segmented mold side halves to be used in blow molding of hollow plastic articles, which comprises side mold halves, each having upper and lower ends, movable away from each other to open said mold, means associated with said side mold halves and operative during the opening thereof for moving said halves first in a direction away from said bottom part without separating said halves and subsequently in continuation of said movement linearly away from each other such that parting faces of said halves maintain a lateral alignment, said mold assembly including upper and lower members, each respectively cooperative with said upper and lower ends of said mold halves with means therein for receiving and locking the side mold halves in the closed position, wherein said receiving and locking means are provided with tapered surfaces matching corresponding tapered surfaces of said halves and wherein said means for moving is operative to move said halves axially to clear said tapered surfaces.

* * * * *

UNITED STATES PATENT AND TRADEMARK OFFICE
CERTIFICATE OF CORRECTION

PATENT NO. : 4,352,653
DATED : October 5, 1982
INVENTOR(S) : Lothar Ott and Dieter Gessner It is certified that error appears in the above-identified patent and that said Letters Patent are hereby corrected as shown below:

Column 3, line 38, change "follower" to ---followers---.

Column 4, line 49, claim 2, change "plate" to ---plates---.

Signed and Sealed this

Twelfth Day of April 1983

[SEAL]

Attest:

GERALD J. MOSSINGHOFF

Attesting Officer     Commissioner of Patents and Trademarks